(12) United States Patent
Wu et al.

(10) Patent No.: US 9,542,609 B2
(45) Date of Patent: Jan. 10, 2017

(54) AUTOMATIC TRAINING OF A PARKED VEHICLE DETECTOR FOR LARGE DEPLOYMENT

(71) Applicant: Xerox Corporation, Norwalk, CT (US)

(72) Inventors: Wencheng Wu, Webster, NY (US); Edul N. Dalal, Webster, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 304 days.

(21) Appl. No.: 14/172,525

(22) Filed: Feb. 4, 2014

(65) Prior Publication Data

US 2015/0220791 A1 Aug. 6, 2015

(51) Int. Cl.
*G06K 9/00* (2006.01)
*H04N 7/18* (2006.01)

(52) U.S. Cl.
CPC ....... *G06K 9/00812* (2013.01); *G06K 9/00785* (2013.01); *H04N 7/183* (2013.01)

(58) Field of Classification Search
CPC .............. G06K 9/00791; G06K 9/6262; G06K 9/00798; G06K 9/00812; H04N 7/183
See application file for complete search history.

(56) References Cited

U.S. PATENT DOCUMENTS

| | | | |
|---|---|---|---|
| 5,940,481 A * | 8/1999 | Zeitman | G06Q 20/127 340/932.2 |
| 6,678,394 B1 * | 1/2004 | Nichani | G05D 1/0251 348/169 |
| 8,447,690 B2 | 5/2013 | Salmon Rock et al. | |
| 8,493,237 B2 | 7/2013 | Grievink et al. | |
| 8,520,975 B2 * | 8/2013 | Wang | G06T 7/20 345/626 |
| 8,600,786 B2 | 12/2013 | Stefik et al. | |
| 2006/0136131 A1 | 6/2006 | Dugan et al. | |
| 2006/0274171 A1 * | 12/2006 | Wang | G06K 7/14 348/294 |
| 2011/0133958 A1 | 6/2011 | Carboon et al. | |
| 2011/0163894 A1 | 7/2011 | Grievink et al. | |
| 2012/0106801 A1 * | 5/2012 | Jackson | G08G 1/205 382/105 |

(Continued)

OTHER PUBLICATIONS

U.S. Appl. No. 13/835,386, filed Mar. 15, 2013, Bulan et al.

(Continued)

*Primary Examiner* — Sath V Perungavoor
*Assistant Examiner* — Philip Dang
(74) *Attorney, Agent, or Firm* — Kermit D. Lopez; Luis M. Ortiz; Ortiz & Lopez, PLLC

(57) ABSTRACT

Methods and systems for training a parked vehicle detector. Video data regarding one or more parking sites can be captured. Positive training samples can then be collected from the video data based on a combination of one or more automated computing methods and human-input auxiliary information. Additionally, negative training samples can be collected from the video data based on automated image analyses with respect to the captured video data. The positive training samples and the negative training samples can then be used to train, re-train or update one or more parked vehicle detectors with respect to the parking site(s) for use in managing parking at the parking site(s).

16 Claims, 6 Drawing Sheets

(56) References Cited

U.S. PATENT DOCUMENTS

| | | | |
|---|---|---|---|
| 2012/0117084 A1* | 5/2012 | Tang | G06T 7/2033 |
| | | | 707/748 |
| 2013/0057686 A1* | 3/2013 | Genc | B60R 1/00 |
| | | | 348/148 |
| 2013/0066660 A1 | 3/2013 | Kopitzke et al. | |
| 2013/0185203 A1 | 7/2013 | Salmon Rock et al. | |
| 2013/0258107 A1* | 10/2013 | Delibaltov | G06K 9/00785 |
| | | | 348/148 |
| 2013/0265419 A1 | 10/2013 | Bulan et al. | |
| 2013/0265423 A1 | 10/2013 | Bernal et al. | |
| 2013/0265426 A1 | 10/2013 | Fan et al. | |
| 2013/0266187 A1 | 10/2013 | Bulan et al. | |
| 2013/0266188 A1 | 10/2013 | Bulan et al. | |
| 2013/0266190 A1* | 10/2013 | Wang | G06K 9/3258 |
| | | | 382/105 |
| 2013/0275180 A1 | 10/2013 | Goddard et al. | |
| 2013/0330008 A1* | 12/2013 | Zadeh | G06N 7/02 |
| | | | 382/195 |
| 2013/0344859 A1* | 12/2013 | Abramson | G06Q 50/265 |
| | | | 455/418 |
| 2014/0005919 A1* | 1/2014 | Mattila | G01C 21/00 |
| | | | 701/408 |

OTHER PUBLICATIONS

U.S. Appl. No. 13/836,310, filed Mar. 15, 2013, Wu et al.
U.S. Appl. No. 14/018,628, filed Sep. 5, 2013, Wang et al.
U.S. Appl. No. 14/095,159, filed Dec. 3, 2013, Wu et al.
Leotta, M. J. et al., "Vehicle Surveillance with a Generic, Adaptive, 3D Vehicle Model," IEEE Transactions on Pattern Analysis and Machine Intelligence (2011) 33(7):1457-1469.
Mortensen, E. N. et al., "Intelligent Scissors for Image Composition," SIGGRAPH '95 Proceedings of the $22^{nd}$ Annual Conference on Computer Graphics and Interactive Techniques (1995) New York, NY, pp. 191-198.
Shotton, J. et al., "TextonBoost for Image Understanding: Multi-Class Object Recognition and Segmentation by Jointly Modeling Texture, Layout, and Context," International Journal of Computer Vision (2009) 81(1):2-23.
Xu, C. et al., "Snakes, Shapes, and Gradient Vector Flow," IEEE Transactions on Image Processing (1998) 7(3):359-369.

* cited by examiner

|   | Hue | Patch |
|---|---|---|
| R: Red | 0.000 | |
| O: Orange | 0.084 | |
| Y: Yellow | 0.167 | |
| YG: | 0.250 | |
| G: Green | 0.333 | |
| GC: | 0.417 | |
| C: Cyan | 0.500 | |
| CB: | 0.583 | |
| B: Blue | 0.667 | |
| BM: | 0.750 | |
| M: Magenta | 0.833 | |
| MR: | 0.916 | |
| R: Red | 1 | |

AUTOMATIC TRAINING OF A PARKED VEHICLE DETECTOR FOR LARGE DEPLOYMENT

FIELD OF THE INVENTION

Embodiments are generally related to the field of parking management. Embodiments are also related to a video-based parking occupancy detection system (VPODS) and applications thereof. Embodiments are additionally related to the training of a parked vehicle detector.

BACKGROUND

A balance between supply and demand must be determined to meet the parking requirements of motorists. The ability to efficiently allocate and manage on-street parking remains elusive even when parking requirements are significant, recurring, and known ahead of time. For instance, urban parking spaces characteristically undergo periods of widely skewed demand and utilization, with low demand and light use in some periods, often during the night, and heavy demand and use at other times. Real-time parking occupancy detection systems are an emerging technology in parking management.

A parked vehicle detector is a critical element for the success of a VPODS. Such a vehicle detector needs to detect vehicles with a high accuracy (e.g., >95%) for all poses and under all conditions. To achieve this requirement, one strategy involves the use of multiple vehicle detectors, wherein each vehicle detector corresponds to and is only operative under some constrained conditions (e.g., limited to one camera pose and day time only). A parked vehicle detector in a VPODS can then be retrained to achieve such accuracy when it is operative only under these constrained conditions. When and if a different set of constrained conditions occurs, a retraining process can be conducted to generate a new parked vehicle detector to be operative under the new set of constrained conditions. This re-training approach, however, is typically costly in time and labor since identification and cropping of parked vehicles must be performed manually over a sufficiently long period of time.

Additionally, conventional image segmentation techniques for use in vehicle detection typically segment an image into many pieces based on features such as color, texture, etc. Such an approach may not include the use of semantic meanings (e.g., a car, a motorcycle, or even a bicycle) unless a further higher-level grouping and refinement operation is applied. Such image segmentation techniques are not suitable for vehicle detection in real-time applications in a VPODS since their computation is slow and performance is poor. Such an approach is also not accurate when utilized for collecting training samples.

Based on the foregoing, it is believed that a need exists for improved methods and systems for automatically training a parked vehicle detector for large deployment, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved parking management method and system.

It is another aspect of the disclosed embodiments to provide for an improved video-based parking occupancy detection technique.

It is a further aspect of the disclosed embodiments to provide for an improved method and system for automatically training a parked vehicle detector.

The aforementioned aspects and other objectives and advantages can now be achieved as described herein. Methods and systems for training a parked vehicle detector are disclosed. Video data regarding one or more parking sites can be captured. Positive training samples can then be collected from the video data based on a combination of one or more automated computing methods and human-input auxiliary information. Additionally, negative training samples can be collected from the video data based on automated image analyses with respect to the captured video data. The positive training samples and the negative training samples can then be used to train, re-train or update one or more parked vehicle detectors with respect to the parking site(s) for use in managing parking at the parking site(s).

In some embodiments, techniques can be implemented for automatically training a parked vehicle detector for large deployment of a VPODS via a voluntary crowd-sourcing unit and/or a vehicle re-identification unit. In such an embodiment, a parker (or a person associated with the parked vehicle such as one of its passengers) can voluntarily localize a vehicle approximately utilizing a parking management unit (e.g., account-based mobile parking or image-assisted parking kiosk) coupled with the voluntary crowd-sourcing unit. An appropriate localization approach can then be selected and performed by an algorithm to determine a precise location of the vehicle based on said human-input approximate location and corresponding image and information can be stored in a collected positive training sample set. Alternatively or additionally, the vehicle can then be re-identified utilizing the location and account information by the vehicle re-identification unit upon initiation by the parker. If confidence of the re-identification exceeds a pre-specified threshold, the corresponding image and information of the re-identified vehicle can be stored in the collected positive training sample set. Finally, the collected positive training sample set can be utilized to train, re-train, or update the parked vehicle detector for each deployment site.

Note that voluntary crowd-sourcing units and vehicle re-identification units can act independently. The disclosed approach, however, requires one such unit in action. It can be appreciated, however, that in some embodiments these units can certainly operate efficiently with both in action. Voluntary crowd-sourcing units can operate for users of account-based mobile parking and arbitrary users via an image-assisted parking kiosk. The aforementioned vehicle re-identification unit in some instances may only work for users of account-based mobile parking.

Frames from a long video sequence can be automatically selected based on the time when a user initiates the action of starting or ending a parking session (i.e., the frame representing an instantaneous snapshot of the parking area of interest at the time a parking session starts or ends can be automatically extracted) or voluntarily selected by the user. A user input (e.g., by use of a touch screen to point to some pixels of the vehicle or to start an account-based parking session) can then be provided to the frames so that the appropriate vehicle can be localized utilizing one or more automated computing methods and said user-input (human-input) information. These localized parked vehicles can then be employed for training or re-training the vehicle detector in the context of a deployed VPODS. A framework for streaming a lower resolution video of the VPODS and/or instant snapshot can be provided to the user looking for a parking space. Incentives can also be employed to acquire the information regarding the parking space. The positive training sample collector can receive the image frame seen by the parker and a touch screen input coordinate and perform the image segmentation technique to localize the vehicle and crop the vehicle for future training/retraining of the vehicle detector for the VPODS of that particular site.

The image segmentation can be performed by obtaining a sub-image cropped from the image frame at location centered about a centroid of the touch-screen coordinate input by the parker. K-means clustering can be applied to segment the color pixels into at least two classes (e.g., color of vehicle body and vehicle windows). Color statistics, mean and covariance matrix can be calculated for a dominant class color pixel (assuming that is color of vehicle body). A region can then be grown based on color statistics until the color statistics change above a pre-defined threshold or the size of the region falls within the pre-defined range or the region growth stops for a while as the threshold for color clustering is varied, or it hits the boundary of an already detected vehicle.

Vehicle re-identification performs matches in current data set based on previously acquired characteristics (i.e., initial information available for re-identification). The system accepts both unique and non-unique identifiers for vehicle re-identification. A vehicle color-based re-identification can be performed, for example, for a non-neutral color vehicle since neutral color can be easily confused with a pavement color in the parking area. Other vehicle information on physical dimensions such as length, width, height, etc., can be employed for the vehicle re-identification. The knowledge regarding the region of interest (ROI) in a parking area can be incorporated to reduce chance of a false-positive. A vehicle contour re-identification can also be performed based on rendering of 3D (Three-Dimensional) vehicle model to cover broader vehicles utilizing 3D rendering capability and a database of vehicle templates.

The system makes parker-vehicle association more effective with just a simple confirmation and identifies situations where parking violations occur. The vehicle detector can be trained in the VPODS to either include a large set of training samples, which encompass various environmental conditions, or even to train multiple vehicle detectors which are tuned to each condition and apply them accordingly. The system serves as an intermediate means to eventually train the vehicle detector that can perform in real-time with high accuracy for each deployment site.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
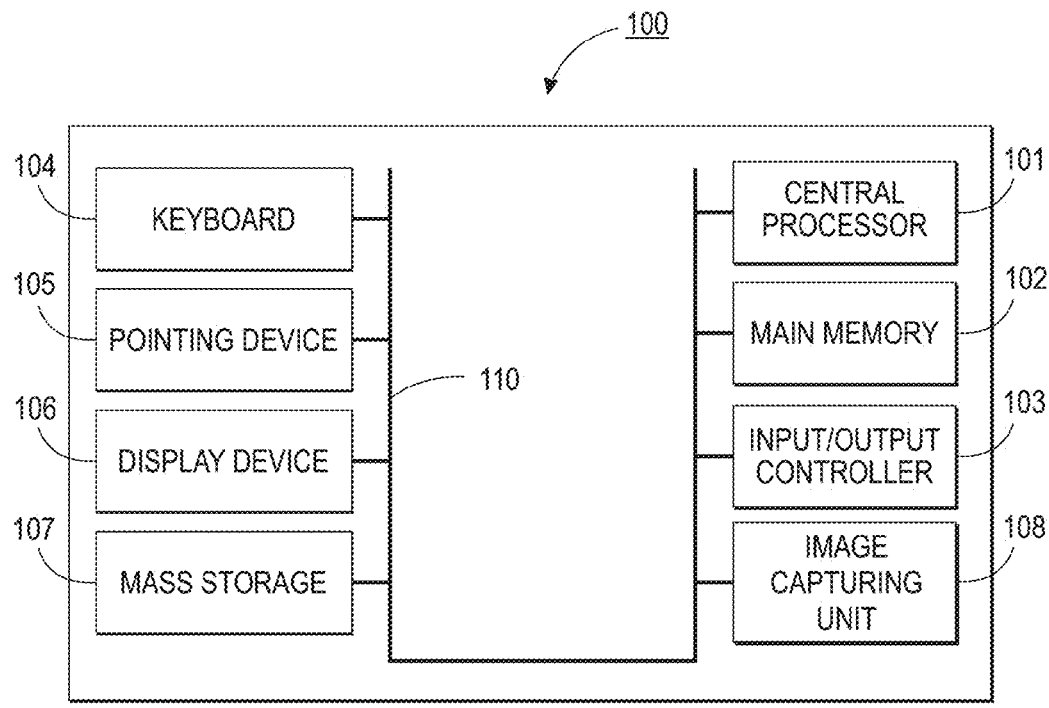
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce or assist in implementing the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
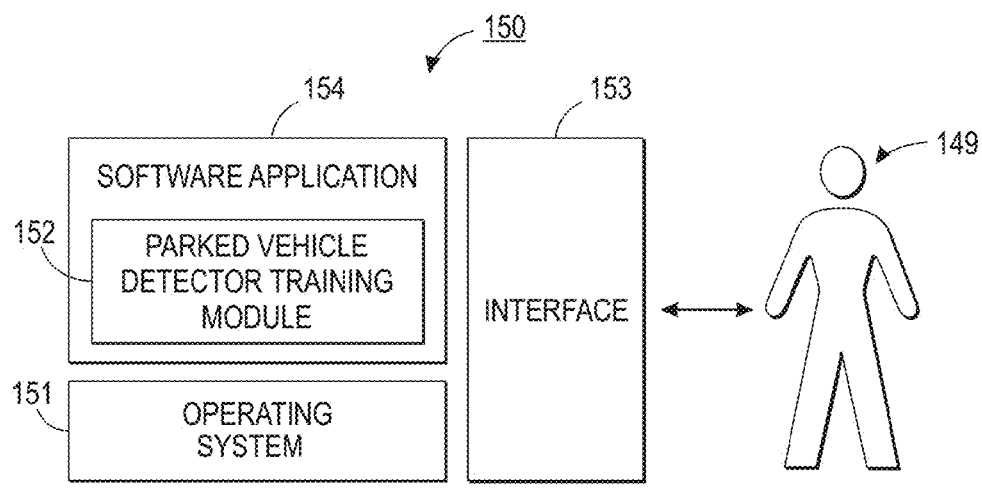
FIG. 2 illustrates a schematic view of a software system including a parked vehicle detector training module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a system bus 110, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), and an image capturing unit 108. In some embodiments, for example, a USB peripheral connection (not shown in FIG. 1) and/or other hardware components may also be in electrical communication with the system bus 110 and components thereof. As illustrated, the various components of data-processing system 100 can communicate electronically through the system bus 110 or a similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term "module" as utilized herein may refer to a collection of routines and data structures that perform a particular task or implement a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term "module" may also simply refer to an application such as a computer program designed to assist in the performance of a specific task such as word processing, accounting, inventory management, etc.

The interface 153, which is preferably a graphical user interface (GUI), also serves to display results, whereupon the user 149 may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operating systems such as, for example, Linux may also be employed with respect to operating system 151 and interface 153. The software application 154 can include a parked vehicle detector training module 152 for training a parked vehicle detector 390. Software application 154, on the other hand, can include instructions such as the various operations described herein with respect to the various components and modules described herein such as, for example, the method depicted in FIG. 5.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 3:
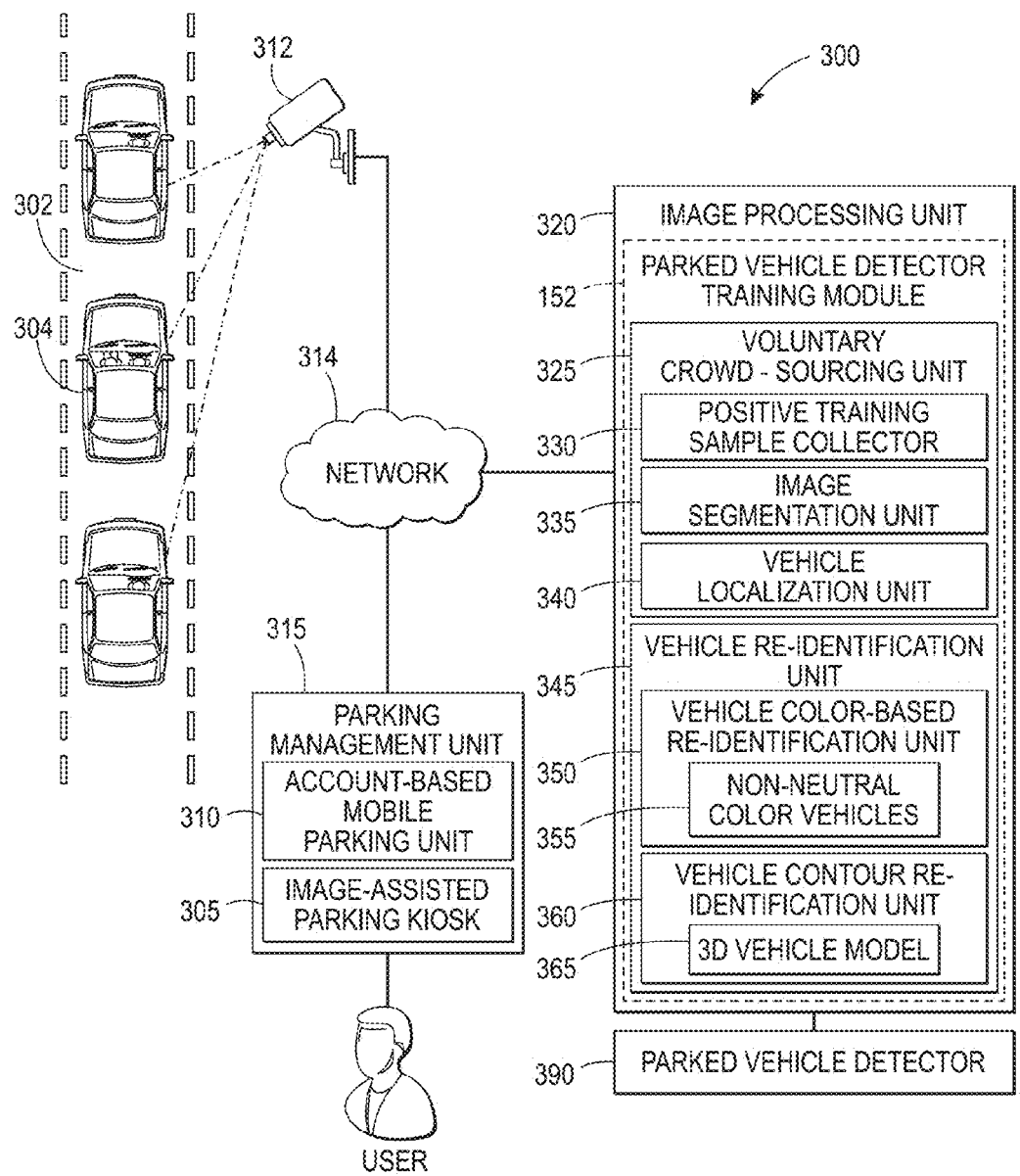
FIG. 3 illustrates a block diagram of a parked vehicle detector training system, in accordance with the disclosed embodiments.

FIG. 3 illustrates a block diagram of a parked vehicle detector training system 300, in accordance with the disclosed embodiments. Note that in FIGS. 1-8, identical or similar blocks are generally indicated by identical reference numerals. The actual parked vehicle detector training system 300 generally includes a parked vehicle detector training module 152 coupled with a parking management unit 315 for automatically training a parked vehicle detector 390 for large deployment of a video-based parking occupancy detection system via a voluntary crowd-sourcing unit 325 and a vehicle re-identification unit 345. The parking management unit 315 can be configured with an account based mobile parking unit 310 and/or an image-assisted parking kiosk 305. An image capturing unit 312 (e.g., camera) associated with the parked vehicle detector training system 300 captures an image of a vehicle 304 and a parking space 302 within an effective field of view.

The image-capturing unit 312 can be deployed on site to monitor at least one parking space. The vehicle 304 can be, for example, automobiles, cars, trucks, vans, buses, motor homes, tankers, motorcycles, or other vehicles, etc., as well as trailers of all kinds in-tow. The image capturing unit 312 can be operatively connected to an image processing unit 320 via a network 314. Note that the image capturing unit 312 described in greater detail herein is analogous or similar to the image capturing unit 108 of the data-processing system 100, depicted in FIG. 1. The image-capturing unit 312 may include built-in integrated functions such as image processing, data formatting and data compression functions. Also, the unit 312 may include image-positioning, range-finding, and an illumination unit (e.g., flash).

Note that the network 314 may employ any network topology, transmission medium, or network protocol. The network 314 may include connections such as wire, wireless communication links, or fiber optic cables. Network 314 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The voluntary crowd-sourcing unit 325 facilitates a parker and/or user 149 to voluntarily localize the vehicle 304 utilizing the parking management unit 315 associated with the voluntary crowd-sourcing unit 325. Note that the parking management unit 315 can be, for example, an account-based mobile parking unit 310 or an image-assisted parking kiosk 305. In general, the parking kiosk 305 serves to regulate parking for a run of parking spaces 302. The parking kiosk 305 can be augmented with an image display capability and a plurality of functions such as, for example, touch screen, mouse, and/or selecting and entering buttons. As a simple example use case, consider the situation in which after a parker has parked his or her vehicle, the parker would initiate a parking session by interacting with the image-assisted parking kiosk (e.g., via touch screen) to identify approximate location of his or her vehicle on the displayed image of the parking area. The voluntary crowd sourcing unit 325 can then utilize this auxiliary human-input information (e.g., approximate location of his vehicle) and select an appropriate localization unit 340 by implementation of a particular algorithm or processing of an appropriate module (e.g., software module) to determine the final position of the vehicle 304. The voluntary crowd-sourcing unit 325 generally stores the corresponding image and information with respect to final position of the vehicle 304 in a collected positive training sample collector 330.

Assuming we continue with the above simple use case, alternatively or additionally, after the parker parked his or her vehicle, the parker can initiate a parking session on his or her previously registered account via his or her mobile device. The action of initiating a parking session can provide an approximate location of the parked vehicle (e.g., via GPS information). The previously registered account contains at least parker information (e.g., payment option, photo ID, etc.) as well as the parker's vehicle information (e.g., vehicle make and model, color, license plate, etc.). The vehicle re-identification unit 345 can then re-identify the user vehicle 304 utilizing location information and account information upon initiation by the registered parker 149. The vehicle re-identification unit 345 stores the corresponding image and information of the re-identified vehicle 304 in the collected positive training sample collector 330 if confidence of the re-identification exceeds a pre-specified threshold. The vehicle re-identification unit 345 employs the collected positive training sample collector 330 for each deployment site to train, re-train, or update the parked vehicle detector 390 for each specific site.

Many techniques can be utilized in the context of the voluntary crowd-sourcing unit 325 for collecting positive training samples. In one embodiment, for example, the positive training sample collector 330 can receive the image frame seen by the parker 149 and a touch screen input coordinate and perform the image segmentation technique to localize the vehicle 304 and crop it out for future training/retraining of the vehicle detector 390 for the VPODS of that particular site. In another embodiment, the positive training sample collector 330 can receive the image frame seen by the parker 149 and the approximate bounding box coordinates of a vehicle provided by the parker via GUI and perform an image segmentation technique to localize the vehicle 304 and crop it out for future training/retraining of the vehicle detector 390 for the VPODS of that particular site. Note that other combinations of human input methods (e.g., touch screen, bounding box, mouse clicks, etc.) and automated image segmentation techniques (e.g., color-based or edge-based segmentation, an intelligent scissor, a graph cut segmentation, a color-based clustering, and a mean-shift segmentation) can be used to localize the vehicle 304 and crop it out for future training/retraining of the vehicle detector 390 for the VPODS of that particular site.

Similarly, a variety of techniques can be utilized in the context of the vehicle re-identification unit 345 for collecting positive training samples. In one embodiment, for example, a vehicle color-based re-identification unit 350 can perform color-based vehicle re-identification for a vehicle 355 if the color of the vehicle is easily distinguishable from the pavement color in the parking area. In another embodiment, a vehicle contour re-identification unit 360 can perform vehicle contour re-identification based on rendering of 3D vehicle model 365 to cover broader vehicles. A 3D rendering capability and a database of vehicle templates may be required in this scenario and is suitable for offline processing. In yet another embodiment, a vehicle may be re-identified based on its make and model, the color, the alphanumeric license plate information, the location of the parking site where the parking session was initiated, etc. In the disclosed embodiments, the system 300 can serve as an inter-medium means to eventually train the vehicle detector 390 that can perform in real-time with high accuracy for each deployment site.

Figure 4:
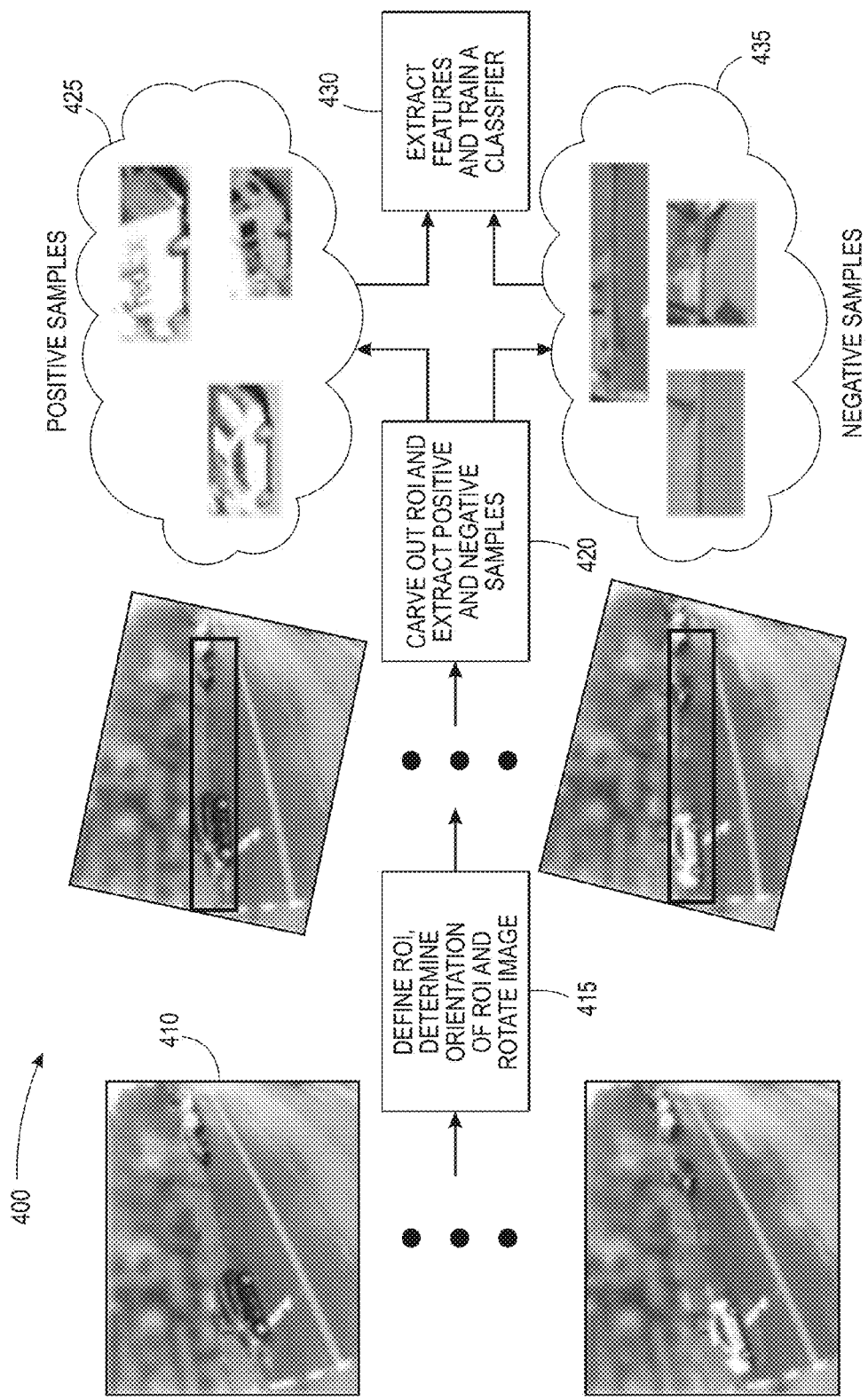
FIG. 4 illustrates a block diagram of an offline training system associated with the parked vehicle detector, in accordance with the disclosed embodiments.

FIG. 4 illustrates a block diagram of an offline training system 400 of the parked vehicle detector 390, in accordance with the disclosed embodiments. In general, training sample collection is a process for machine learning and often consumes a great portion of the efforts involved. A region of interest can be defined and an orientation of the region of interest can be determined to rotate an image frame 410 from captured video, as shown in block 415. The region of interest can be carved and a positive and negative sample 425 and 435 can be extracted, as shown at block 420. Collecting negative training samples 435 (i.e., images 410 of sections of the parking region without vehicle 304, as shown in FIG. 4, or with only partial vehicles 304 rather than entire vehicle 304) can be performed by automated methods combining motion detection, background modeling, road color information, etc., that provide indication that a region does not have the vehicle 304 or can compose the image that does not have the vehicle 304 by removing motion in the background modeling. The negative samples 435 do not require precise cropping.

On the other hand, the presence of the vehicle 304 and its precise location for cropping (this is the main challenge) must be known for collecting the positive training samples 425. Note that cropping a partial vehicle (i.e., significantly inaccurate localization of the vehicle) is considered the negative sample 435. This makes collecting negative samples 435 even simpler (e.g., by using random cropping) since the chance that a random crop of the image 410 matches a precise crop of the vehicle 304 is very low. Hence, a simple strategy for collecting negative samples 435 is to randomly crop the images 410 off regions of streets that are nearly empty (collected from actual scene or composed by background modeling). The features can be extracted from the positive and negative training samples 425 and 435 and the classifier can be trained, as indicated at block 430.

Figure 5A:
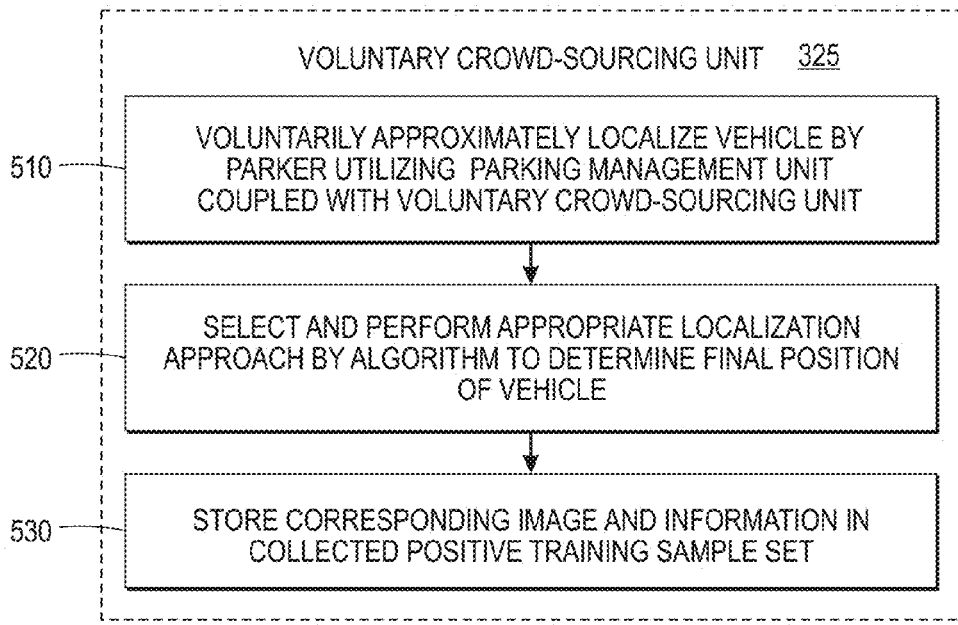
FIGS. 5A-5B respectively illustrate flow diagrams indicative of logical operational steps of a method for training the parked vehicle detector via the voluntary crowd-sourcing unit or the vehicle re-identification unit or both, in accordance with the disclosed embodiments.
Figure 5B:
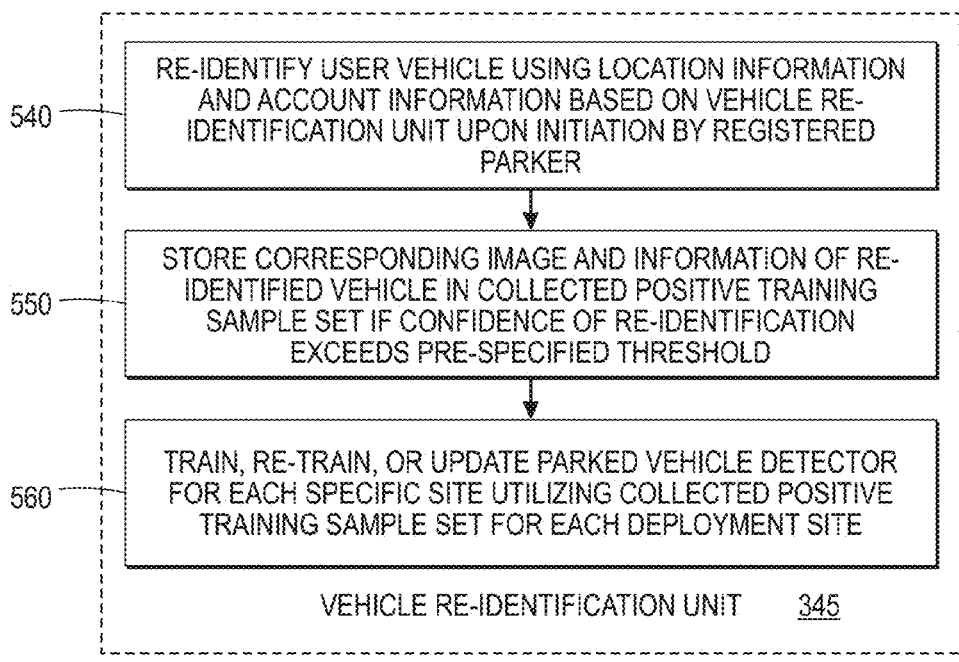

FIGS. 5A-5B respectively illustrate flow diagrams indicative of logical operational steps of a method for training the parked vehicle detector 390 via the voluntary crowd-sourcing unit 325 or the vehicle re-identification unit 345 or both, in accordance with the disclosed embodiments. It can be appreciated that the logical operational steps shown in FIG. 5 can be implemented or provided via, for example, a module such as module 152 shown in FIG. 2 and can be processed via a processor such as, for example, the processor 101 shown in FIG. 1. Note that the voluntary crowd-sourcing unit 325 and vehicle re-identification unit 345 are preferably independent units, but in some instances the operational steps shown in blocks 325 and 345 in FIGS. 5A-5B may be incorporated into a single unit or implemented as a single method, depending upon design considerations.

The parker 149 can voluntarily localize the vehicle 304 approximately (e.g., using a touch screen to point to some pixels of the vehicle 304) utilizing the parking management unit 315 coupled with the voluntary crowd-sourcing unit 325, as indicated at block 510. The appropriate localization approach such as image segmentation techniques can then be selected and performed by the algorithm to determine the final position of the vehicle 304 utilizing the voluntary crowd-sourcing unit 325, as shown at block 520. The corresponding image and information with respect to the final position of the vehicle 304 can be stored in the collected positive training sample collector 330, as depicted at block 530.

The accuracy of the image segmentation unit 335 for accurate localization of the vehicles 304 can be increased with the human inputs from the voluntary crowd-sourcing unit 325. That is, the user 149 can provide helpful information so that the image segmentation unit 335 can determine what the user 149 is looking for and thus perform more efficiently and yield better results. In simple terms, if the user provides helpful information such as the approximate location of his vehicle, it makes the image segmentation problem much simpler and thus better results can be obtained. For example, the user 149 may be asked to roughly outline an object of interest and then the segmentation algorithm can refine the outline based on the image features such as intensity, edges, etc. The object of interest can be outlined precisely by zooming in and out, etc., based on the application module 152 yielding required efficiency and accuracy.

The parking management unit 315 can be integrated with the image-assisted parking kiosk unit 305. When the parker 149 signs into or signs out of the parking session, first the image of the street at that time can be displayed. The parker 149 then, for example, employs a touch screen to provide input and to identify the vehicle 304 to start or end the parking session. The positive training sample collector 330 can receive the image frame seen by the parker 149 and the touch screen input coordinates. The image segmentation unit 335 then localizes the vehicle 304 and crops the vehicle 304 for future training/retraining of the vehicle detector 390 for the VPODS of that particular site.

For example, a N×M sub-image cropped from the image frame at the location centered about the centroid of the touch-screen coordinate input by the parker 149 can be obtained. K-means clustering can then be applied to segment the color pixels into 2 classes (e.g., color of vehicle body and vehicle windows). Color statistics, such as mean and covariance matrix, can be calculated for the dominant class color pixels (assuming that is color of vehicle body). The region is then grown based on color statistics until at least one of the following stop criteria is met: color statistics change above the pre-defined threshold, the size of the region falls within a pre-defined range (note that typical vehicle 304 length range can be used here), the region growth stops for a while as the threshold for color clustering is varied, or it hits the boundary of an already detected vehicle 304.

Figure 6:
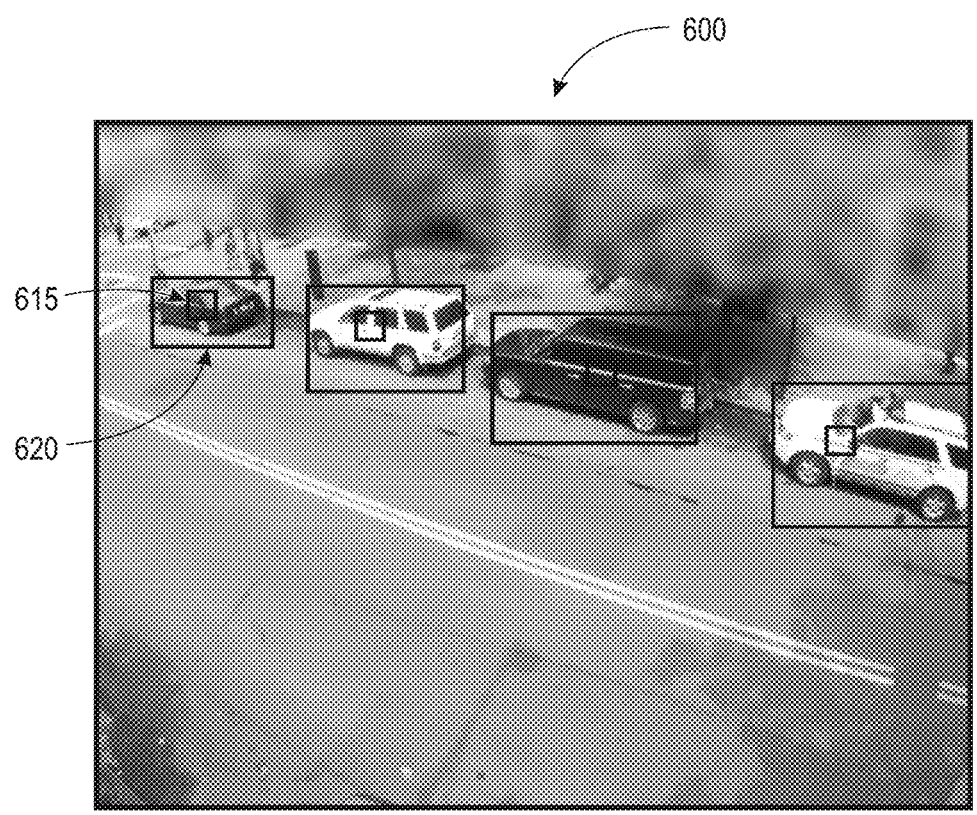
FIG. 6 illustrates a multi-level graphical user interface showing result of vehicle detection utilizing simple color clustering with a simulated human touch-screen input, in accordance with the disclosed embodiments.

FIG. 6 illustrates a multi-level graphical user interface 600 that displays the result of vehicle detection utilizing simple color clustering with human touch-screen input, in accordance with the disclosed embodiments. FIG. 6 is a real-life illustrative example of using the voluntary crowd-sourcing unit 325 to detect and localize a vehicle that can be used as positive training sample. First, frames from long video sequences can be selected when the voluntary initiation of starting or ending a parking session by the user 149 occurs and then the user inputs can be provided and associated to the frames so that appropriate vehicles 304 can be localized and employed for training or re-training the vehicle detector 390 in deployed VPODS. The framework for streaming lower resolution video of the VPODS and/or instant snapshot per request from the public can be provided to the user 149 looking for the parking space 302. Incentives can also be employed to acquire the information regarding the parking area. Note that the inputs can be provided voluntarily and by regular users 149.

The graphical user interface 600 illustrates example results of a MATLAB implementation utilizing the color clustering/region growing technique with human touch-screen inputs. As shown in the figure, the accuracy of vehicle localization using such method is sufficient as a means for training the vehicle detector 390. Note that in this figure, a box 615 represents the user input of the touch screen location, which allows the automated method to compute initial statistics of color duster and then to grow the region to a box 620 representing the result of vehicle localization constrained to a parking ROI based on the initial statistics of color duster.

Alternatively or additionally, the user vehicle 304 can be re-identified utilizing the location information and account information based on the vehicle re-identification unit 345 upon initiation by the registered parker 149, as shown at block 540. If confidence of the re-identification exceeds the pre-specified threshold, the corresponding image and information of the re-identified vehicle 304 can be stored in the collected positive training sample collector 330, as indicated at block 550. Finally, the collected positive training sample set for each deployment site can be utilized to train, re-train, or update the parked vehicle detector 390 for each specific site, as depicted at block 560.

The vehicle re-identification unit 345 performs matches in current data set based on some characteristics gathered before (i.e., initial information available for re-identification). For example, using automated license plate recognition (ALPR) to determine the usage/route of the vehicle 304 on a toll road (open tolling) can be considered as a means for vehicle re-identification. Since a vehicle license plate is a unique identifier, the matching is unique if no error occurred in the ALPR. Other types of information available for re-identification, such as vehicle make, model, color etc., may be non-unique.

The vehicle re-identification unit 345 accepts both unique and non-unique means for the vehicle re-identification. In one embodiment, the vehicle re-identification unit 345 re-identifies vehicle color using color-based methods if the color of the vehicle can be easily distinguished from the pavement color in parking area. Other vehicle information on physical dimensions such as length, width, height, etc., can be employed to make the system more robust. The knowledge about the region of interest (ROI) can be incorporated in the parking area to reduce the chance of false-positives. In another embodiment, the vehicle re-identification unit 345 re-identifies vehicle contour based on rendering of 3D vehicle model to cover broader vehicles than color-based approach. A 3D rendering capability and a database of vehicle templates are required.

Note that the rough location information can be used to simplify the re-identification task. As an example, the location information may be extracted when a parker initiates the parking session. This would provide a rough location (e.g., streets or even stalls) of his parked vehicle. For example, the color of the parker's vehicle may be red. In this simple scenario, the task of re-identification can be simplified to determining a red vehicle on a known street (or streets). A working example will be discussed/illustrated below. Note that in some embodiments, if the re-identification units identified more than one vehicle (e.g., 2 red vehicles happen to be present on the same street around the same time), all vehicles can be collected for training.

Figures 7, 8:
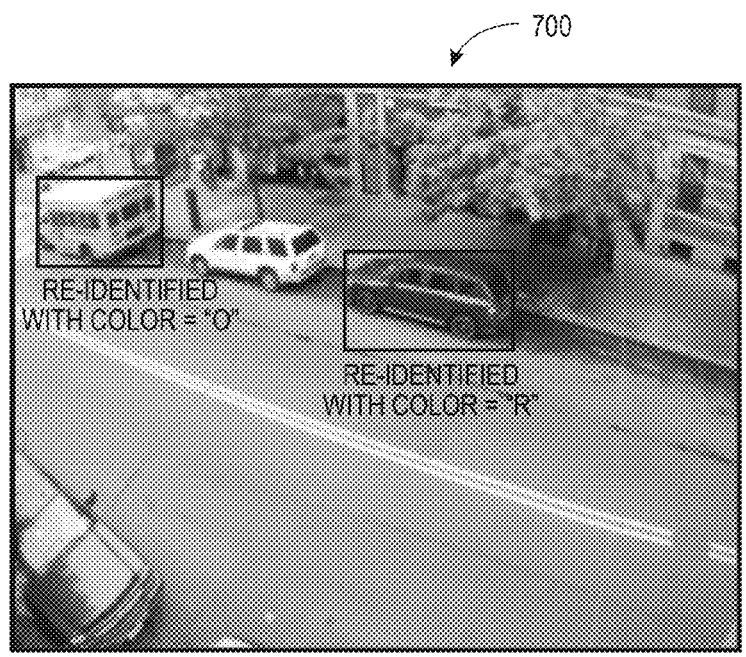
FIG. 7 illustrates a hue-table of discrete colors employed for a coarse color-based vehicle re-identification, in accordance with the disclosed embodiments.
FIG. 8 illustrates a multi-level graphical user interface showing result of discrete colors employed for the coarse color-based vehicle re-identification, in accordance with the disclosed embodiments.

A real-time operation of vehicle re-identification unit 345 is illustrated using a color-based vehicle re-identification algorithm. The color-based vehicle re-identification algorithm can be tested on images extracted from live videos. FIG. 7 illustrates hue-table 650 of discrete colors employed for coarse color-based vehicle re-identification, in accordance with the disclosed embodiments. The hue-table 650 illustrates a coarse ring-around with 12 steps in hue (starting from color 660 and ending at color 665). The hue-table can be obtained from various standards (e.g., X11 color names) with finer scale. The vehicle re-identification can be performed based on an input color string (e.g., "R" for the red car, "O" for the orange-ish yellow school bus); and the results are depicted in FIG. 8.

The essence of this disclosure is as follows. The system 300 couples extra just-in-time voluntary inputs (e.g., either human inputs from the image assisted parking kiosk 305 or the account-based mobile parking 310 from registered users 149) with appropriate image processing algorithms (which are offline and with high accuracy in localization of vehicles) to collect positive training samples for training vehicle detector 390 in VPODS. The account-based or time-based parking management system 300 provides "just-in-time" and "voluntary" inputs and/or collects voluntary inputs via public crowd-sourcing or social media etc.

The system 300 improves the vehicle detector 390 for each site making parker-vehicle association more effective and more importantly to identify situations where parking violations occur (i.e., detection of the vehicles 304 whose parkers are not willing to pay and provide input). The system 300 extends the training phase of the vehicle detector 390 for each deployed site via "voluntary" inputs and thus greatly reduces the cost of "paid" human inputs. The appropriate color segmentation method (for voluntary crowd-sourcing category) and/or the vehicle re-identification unit 345 (for registered users 149 in account-based parking) can be selected based on the system 300 implementation. The system 300 selects the right image frame at the right time with useful voluntary user inputs and utilizes that to confidently localize the vehicles 304 for later training or re-training. The system 300 can serve as an inter-medium means to eventually train the vehicle detector 390 that can perform in real-time with high accuracy for each deployment site.

The system 300 makes parker-vehicle association more effective. The vehicle detector 390 can be trained in VPODS to either include a large set of training samples, which encompass various environmental conditions, or even to train multiple vehicle detectors 390, which are tuned to each condition and apply them accordingly. Without the use of the disclosed methods here, such an approach can further prolong the training phase of the vehicle detector 390 for each deployed site and greatly increase the cost of paid human inputs.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. An image-processing method for training a parked vehicle detector, said method comprising:
    capturing video data of at least one parking site utilizing at least one image-capturing unit associated with a parked vehicle detector training system for training said parked vehicle detector, said video data including an image of at least one vehicle and at least one parking space within an effective field of view;
    collecting a plurality of positive training samples from said video data captured by said at least one image-capturing unit based on a combination of data including data provided by an automated image analysis and human-input auxiliary information provided by a crowd-sourcing unit that stores images and information with respect to a final position of said at least one vehicle in a collected positive training sample collector;
    collecting a plurality of negative training samples from said video data based on said automated image analyses with respect to said captured video data; and
    utilizing said plurality of positive training samples and said plurality of negative training samples to train, re-train, and update said parked vehicle detector with respect to said at least one parking site for use in managing parking at said at least one parking site.

2. The method of claim 1 wherein said video data includes images of accurately parked vehicles with respect to said at least one parking site.

3. The method of claim 1 wherein said human-input auxiliary information includes information voluntarily provided by parkers of vehicles at said at least one parking site and wherein said negative training samples are collected by randomly cropping from said video data, regions of streets contained in said video data that are nearly empty.

4. The method of claim 3 wherein said human-input auxiliary information voluntarily provided by said parkers of said vehicles comprises:
    a color, a make, and a model of a vehicle;
    alphanumeric information associated with a vehicle license plate; and
    an approximate pixel location of said vehicle on an image displayed to a parker via a display module.

5. The method of claim 4 wherein said human-input auxiliary information includes information collected from a registration process associated with an account-based parking system, said registration process including use of said crowd-sourcing unit to collect and store said human-input auxiliary information.

6. The method of claim 4 further comprising collecting said human-input auxiliary information voluntarily provided by parkers of vehicles via:
    a GUI of an image-assisted parking kiosk associated with said at least one parking site.

7. The method of claim 4 wherein said vehicle re-identification method comprises color-based clustering for re-identifying vehicles for registered users, wherein said color-based clustering comprises a K-means clustering applied to segment color pixels into at least two classes with color statistics, mean, and a covariance matrix calculated for a dominant class color pixel among said at least two classes.

8. The method of claim 7 wherein said vehicle re-identification method further comprises vehicle contour re-identification for registered users based on rendering of a three-dimensional vehicle model and template matching and shape matching.

9. The method of claim 3 wherein said automated image analyses with respect to said captured video data comprises:
    tracking identified regions in said video data over time to further identify a second candidate region for extracting negative training samples; and
    randomly selecting sub-regions with random sizes from said second candidate region.

10. An image processing system for training a parked vehicle detector, said system comprising:
    at least one image-capturing unit;
    a processor that communicates electronically with at least one image capturing unit; and
    a computer-usable medium embodying computer program code, said computer-usable medium capable of communicating with said processor, said computer program code comprising instructions executable by said processor and configured for:
        capturing video data of at least one parking site via at least one image-capturing unit associated with a parked vehicle detector training system for training said parked vehicle detector, said video data including an image of at least one vehicle and at least one parking space within an effective field of view;
        collecting a plurality of positive training samples from said video data captured by said at least one image-capturing unit based on combination of data including data provided by an automated image analysis and human-input auxiliary information provided by a crowd-sourcing unit that stores image and information with respect to a final position of at least one vehicle in a collected positive training sample collector;
        collecting a plurality of negative training samples from said video data based on said automated image analyses with respect to said captured video data; and
        utilizing said plurality of positive training samples and said plurality of negative training samples to train, re-train, and update said parked vehicle detector with respect to said at least one parking site for use in managing parking at said at least one parking site.

11. The system of claim 10 wherein said video data includes images of accurately parked vehicles with respect to said at least one parking site.

12. The system of claim 10 wherein said human-input auxiliary information includes information voluntarily provided by parkers of vehicles at said at least one parking site via said crowd-sourcing unit and wherein said negative training samples are collected by randomly cropping from said video data, regions of streets contained in said video data that are nearly empty.

13. The method of claim 12 wherein said human-input auxiliary information further includes information collected from a registration process associated with an account-based parking system.

14. The system of claim 13 wherein said human-input auxiliary information collected from said registration process includes:
    a color, a make, and a model of a vehicle;
    alphanumeric information associated with a vehicle license plate; and
    an approximate pixel location of said vehicle on an image displayed to a parker via a display module.

15. A non-transitory processor-readable medium storing code representing instructions to cause an image-processing process for training a parked vehicle detector, said code comprising instructions to
    capture video data of at least one parking site via at least one image-capturing unit associated with a parked vehicle detector training system for training said parked vehicle detector, said video data including an image of at least one vehicle and at least one parking space within an effective field of view;

collect a plurality of positive training samples from said video data captured by said at least one image-capturing unit based on a combination of data including data provided by an automated image analysis and human-input auxiliary information provided by a crowd-sourcing unit that stores image and information with respect to a final position of at least one vehicle in a collected positive training sample collector;

collect a plurality of negative training samples from said video data based on said automated image analyses with respect to said captured video data; and utilize said plurality of positive training samples and said plurality of negative training samples to train, re-train, and update said parked vehicle detector with respect to said at least one parking site for use in managing parking at said at least one parking site.

16. The non-transitory processor-readable medium of claim 15 wherein:

said video data includes images of accurately parked vehicles with respect to said at least one parking site;

said human-input auxiliary information includes information voluntarily provided by parkers of vehicles at said at least one parking site and wherein said negative training samples are collected by randomly cropping from said video data, regions of streets contained in said video data that are nearly empty;

wherein said at least one automated computing method comprises an automated image segmentation technique comprising an intelligent scissor, which segments out a region of an image occupied by a vehicle based on:

a color of said vehicle;

an approximate pixel location of said vehicle on an image displayed to a parker via a display module; and location information of said at least one parking site.

* * * * *